United States Patent
Stoehr et al.

(10) Patent No.: US 8,067,349 B2
(45) Date of Patent: Nov. 29, 2011

(54) OIL SOLUBLE COMB POLYMERS

(75) Inventors: Torsten Stoehr, Frankfurt (DE); Boris Eisenberg, Heppenheim (DE); Michael Mueller, Bensheim (DE)

(73) Assignee: Evonik Rohmax Additives GmbH, Darmstadt (DE)

( * ) Notice: Subject to any disclaimer, the term of this patent is extended or adjusted under 35 U.S.C. 154(b) by 846 days.

(21) Appl. No.: 11/909,171

(22) PCT Filed: Apr. 7, 2006

(86) PCT No.: PCT/EP2006/003213
§ 371 (c)(1),
(2), (4) Date: Sep. 20, 2007

(87) PCT Pub. No.: WO2007/003238
PCT Pub. Date: Jan. 11, 2007

(65) Prior Publication Data
US 2008/0194443 A1    Aug. 14, 2008

(30) Foreign Application Priority Data
Jul. 1, 2005  (DE) .......................... 10 2005 031 244

(51) Int. Cl.
*C10M 145/14* (2006.01)
*C10M 149/04* (2006.01)
*C10L 1/18* (2006.01)

(52) U.S. Cl. .................. 508/469; 508/471; 508/475

(58) Field of Classification Search ................. 508/469, 508/471, 475
See application file for complete search history.

(56) References Cited

U.S. PATENT DOCUMENTS

| | | | |
|---|---|---|---|
| 5,565,130 A * | 10/1996 | Omeis et al. ................. | 508/469 |
| 2002/0032293 A1 * | 3/2002 | Bryant et al. ................ | 526/260 |
| 2002/0151443 A1 * | 10/2002 | Srinivasan ................... | 508/273 |
| 2005/0148749 A1 | 7/2005 | Scherer et al. | |
| 2005/0245406 A1 | 11/2005 | Scherer et al. | |
| 2006/0189490 A1 | 8/2006 | Dardin et al. | |
| 2006/0240999 A1 * | 10/2006 | Placek et al. ................. | 508/469 |
| 2007/0191238 A1 | 8/2007 | Fischer et al. | |
| 2007/0213237 A1 | 9/2007 | Scherer et al. | |
| 2007/0219101 A1 | 9/2007 | Scherer et al. | |
| 2009/0182145 A1 | 7/2009 | Bohmke et al. | |

FOREIGN PATENT DOCUMENTS

| | | |
|---|---|---|
| EP | 0 621 293 | 10/1994 |
| EP | 0 699 694 | 3/1996 |

OTHER PUBLICATIONS

U.S. Appl. No. 11/995,949, filed Jan. 17, 2008, Stoehr, et al.
U.S. Appl. No. 11/815,624, filed Aug. 6, 2007, Mueller, et al.
US. Appl. No. 12/668,209, filed Jan. 8, 2010, Stoehr, et al.
US. Appl. No. 61/186,744, filed Jun. 12, 2009, Radano, et al.
US. Appl. No. 12/672,231, filed Feb. 4, 2010, Stoehr, et al.
U.S. Appl. No. 12/279,732, filed Aug. 18, 2008, Stoehr, et al.

* cited by examiner

*Primary Examiner* — Walter Griffin
*Assistant Examiner* — Francis C Campanell
(74) *Attorney, Agent, or Firm* — Oblon, Spivak, McClelland, Maier & Neustadt, L.L.P.

(57) ABSTRACT

The invention relates to comb polymers which comprise, in the main chain, repeating units which are derived from polyolefin-based macromonomers, and repeating units which are derived from low molecular monomers which are selected from the group consisting of styrene monomers having 8-17 carbon atoms, alkyl(meth)acrylates having 1-10 carbon atoms in the alcohol group, vinyl esters having 1-11 carbon atoms in the acyl group, vinyl ethers having 1-10 carbon atoms in the alcohol group, (Di)alkylfumarates having 1-10 carbon atoms in the alcohol group, (Di)alkylmaleates having 1-10 carbon atoms in the alcohol group and mixtures of said monomers. The molar branching degree lies in the region between 0.1-10 mol. % and the comb polymer represents the sum of at least 80 wt. %, in relation to the weight of the repeating units, on repeating units which are derived from polyolefin-based macromonomers, and repeating units which are selected from low molecular monomers which are selected from the group consisting of styrene monomers having 8-17 carbon atoms, alkyl(meth)acrylates having 1-10 carbon atoms in the alcohol group, vinyl esters having 1-11 carbon atoms in the acyl group, vinyl ethers having 1-10 carbon atoms in the alcohol group, (Di)alkylfumarates having 1-10 carbon atoms in the alcohol group, (Di)alkylmaleates having 1-10 carbon atoms in the alcohol group, and mixtures of said monomers.

33 Claims, No Drawings

OIL SOLUBLE COMB POLYMERS

The present application relates to oil-soluble comb polymers, to processes for their preparation and to their use.

Polyalkyl(meth)acrylates (PAMAs)—generally synthesized by simple free-radical copolymerization of a mixture of different alkyl methacrylates (AMAs)—bring about, as oil additives, depending on the molecular weight and composition, a rise in the viscosity index (VI) paired with, in comparison to other viscosity index improvers (VIIs), outstanding low-temperature properties (cf. R. M. Mortier, S. T. Orszulik (eds.), Chemistry and Technology of Lubricants, Blackie Academic & Professional, 1st ed., London 1993, 124-159 & 165-167). A fundamental prerequisite for usability as oil additives is, trivially, the oil solubility of the polymer which, in the case of the PAMAs, depends on the presence of a sufficiently large number of alkyl side chains having typically 6-24 carbon atoms. The VI of PAMA can frequently be raised by copolymerizing short-chain alkyl(meth)acrylates, for example methyl methacrylate or butyl methacrylate (cf. EP 0 637 332, EP 0 937 769 or EP 0 979 834). However, the short-chain component lowers the solubility at low temperatures, so that the proportion of methyl methacrylate, for example, remains restricted to about 25% by weight. The VIs of these comb-like polymers thus achievable are, depending on concentration, permanent shear stability index (PSSI) and base oil type, in the range between 150 and 250.

A further class of VIIs is given by styrene-alkyl maleate copolymers which are obtained by polymer-analogous esterification of styrene-maleic anhydride copolymers with typically C6-C24 alcohols. The esterification is driven up to a conversion of about 95% with addition of butanol. Complete conversion of the acid functionalities is possible by adding an amine to form amidic or imidic groups (U.S. Pat. No. 3,702,300, EP 0 969 077).

The viscosities of polymer solutions in mineral oils or synthetic oils are dependent upon the molecular weight to a high degree. This also has the consequence that the temperature dependence of the viscosity decreases or the VI increases with rising molecular weight (J. Bartz, Additive für Schmierstoffe [Additives for Lubricants], Expert-Verlag, Renningen-Malmsheim 1994, 197-252). In connection with the temperature increase, reference is also made to disentanglement of collapsed knots to give the extended worm-like molecule.

In parallel to the molecular weight, the shear stability, however, decreases as a result of chain breakage under high shear. As a result of this contrary effect, shear-stable VIIs, as required for manual transmission oils, automatic transmission oils, hydraulic oils or motor oils, based on conventional polymer types such as the PAMAs are realizable only with high addition amounts. VIIs with a low contribution to viscosity at low temperatures, normal thickening in the VI range from 40 to 100° C., high contribution to viscosity above 100° C. and simultaneously ensured good oil solubility within the entire temperature range are therefore of particular interest.

In addition to linear comb-like polymers such as the PAMAs, VIIs based on true comb polymers are also already known in the patent literature. EP 0 744 457 describes comb polymers of relatively high order based purely on PAMA, in which the side arms themselves consist of oligomeric PAMA. In addition, the patent literature is aware of two further patents regarding comb polymers in which the side chains consist of saturated or hydrogenated polyolefins and the backbone of short-chain monomers such as AMAs or alkylstyrenes. For instance, EP 0 621 293 describes comb polymers in which the side chains are preferably formed from hydrogenated polybutadiene. Similarly, EP 0 699 694 relates to comb polymers with side arms preferably based on saturated olefin monomers, for example polyisobutylene or atactic polypropylene.

In the widest sense, A-B-A triblock copolymers can also be considered to be comb polymers with only two side arms. For instance, triblock copolymers have already been described as VIIs based purely on PAMA (P. Callais, S. Schmidt, N. Macy, SAE Technical Paper Series, No. 2004-01-3047) and also based on a polybutyl methacrylate core and hydrogenated polybutadiene or polyisoprene arms (U.S. Pat. No. 5,002,676). Anionically prepared A-B-A block copolymers with a polystyrene core and, for example, hydrogenated polyisoprene arms even find commercial use as VIIs (U.S. Pat. No. 4,788,361). Such VIIs are also assigned to the class of the hydrogenated styrene-diene copolymers.

In addition to the above-described application as VIIs, comb polymers with hydrogenated or saturated side arms are also known in entirely different applications. For instance, DE 196 31 170 describes comb polymers for impact-resistant molding materials, the polymers being a sequence of polyisobutylene-containing macromonomers without additional short-chain backbone monomers. Also described in the patent literature is a way of attaching a functionalized polypropylene to a styrene-maleic anhydride backbone in a polymer-analogous reaction to form a soft highly insulating comb polymer gel (EP 0 955, 320); the molecular weights of the polypropylene used are exceptionally high, being up to 300 000 g/mol. In one example from the chemistry of adhesives, comb polymers with hydrogenated polybutadiene or isoprene arms are described, the backbone also comprising acrylic acid as well as AMAs (U.S. Pat. No. 5,625,005).

The polymers detailed above are used commercially in many ways. Accordingly, most of these polymers exhibit a satisfactory property profile. However, there is a permanent effort to remove the relationship of thickening action, viscosity index and shear stability in order to achieve a desired viscosity with minimum use of additive in lubricant oils over a wide temperature range without impairing this property through premature degradation of the polymers.

Furthermore, the polymers should be producible in a simple and inexpensive manner, and especially commercially available components should be used. In this context, they should be producible on the industrial scale without new plants or plants of complicated construction being required for this purpose.

These objects and also further objects which are not stated explicitly but are immediately derivable or discernible from the connections discussed herein by way of introduction are achieved by comb polymers having all features of claim 1. Appropriate modifications to the inventive comb polymers are protected in the subclaims referring back to claim 1. With regard to the process for preparing comb polymers, claim 18 provides a solution to the underlying problem, while claim 26 protects a lubricant oil composition comprising the comb polymers of the present invention.

By virtue of the molar degree of branching being in the range from 0.1 to 10 mol % and the comb polymer comprising a total of at least 80% by weight, based on the weight of the repeat units, of repeat units which are derived from polyolefin-based macromonomers, and repeat units which are derived from low molecular weight monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, it is possible in a not immediately foreseeable manner to provide a comb polymer comprising, in the main chain, repeat units which are derived from polyolefin-based macromonomers, and repeat units which are derived from low molecular weight monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, which have a low shear sensitivity with a high thickening action.

At the same time, the inventive comb polymers allow a series of further advantages to be achieved. These include:

The inventive comb polymers have a particularly high viscosity index-improving action in lubricant oils.

The comb polymers of the present invention can be prepared in a particularly easy and simple manner. It is possible to use customary industrial scale plants.

The term "comb polymer" used herein is known per se, relatively long side chains being bonded to a polymeric main chain, frequently also known as the backbone. In the present case, the inventive polymers have at least one repeat unit which is derived from polyolefin-based macromonomers. The exact proportion is evident via the molar degree of branching. The term "main chain" does not necessarily mean that the chain length of the main chain is greater than that of the side chains. Instead, this term relates to the composition of this chain. While the side chain has very high proportions of olefinic repeat units, especially units which are derived from alkenes or alkadienes, for example ethylene, propylene, n-butene, isobutene, butadiene, isoprene, the main chain comprises relatively large proportions of polar unsaturated monomers which have been detailed above.

The term "repeat unit" is widely known in the technical field. The present comb polymers can preferably be obtained by means of free-radical polymerization of macromonomers and low molecular weight monomers. In this reaction, double bonds are opened up to form covalent bonds. Accordingly, the repeat unit arises from the monomers used. However, the present comb polymers can also be obtained by polymer-analogous reactions and/or graft copolymerization. In this case, the converted repeat unit of the main chain is counted as a repeat unit which is derived from a polyolefin-based macromonomer. The same applies in the case of preparation of the inventive comb polymers by graft copolymerization.

The present invention describes comb polymers which preferably have a high oil solubility. The term "oil-soluble" means that a mixture of a base oil and an inventive comb polymer which has at least 0.1% by weight, preferably at least 0.5% by weight of the inventive comb polymers is preparable without macroscopic phase formation. The comb polymer can be present in dispersed and/or dissolved form in this mixture. The oil solubility depends in particular on the proportion of lipophilic side chains and on the base oil. This property is known to those skilled in the art and can be adjusted for the particular base oil easily via a proportion of lipophilic monomers.

The inventive comb polymers comprise repeat units which are derived from polyolefin-based macromonomers. Polyolefin-based macromonomers are known in the technical field. These repeat units comprise at least one group which is derived from polyolefins. Polyolefins are known in the technical field, and can be obtained by polymerizing alkenes and/or alkadienes which consist of the elements carbon and hydrogen, for example C2-C10-alkenes such as ethylene, propylene, n-butene, isobutene, norbornene, and/or C4-C10-alkadienes such as butadiene, isoprene, norbornadiene. The repeat units derived from polyolefin-based macromonomers comprise preferably at least 70% by weight and more preferably at least 80% by weight and most preferably at least 90% by weight of groups which are derived from alkenes and/or alkadienes, based on the weight of the repeat units derived from polyolefin-based macromonomers. The polyolefinic groups may in particular also be present in hydrogenated form. In addition to the groups which are derived from alkenes and/or alkadienes, the repeat units derived from polyolefin-based macromonomers may comprise further groups. These include small proportions of copolymerizable monomers. These monomers are known per se and include, among other monomers, alkyl(meth)acrylates, styrene monomers, fumarates, maleates, vinyl esters and/or vinyl ethers. The proportion of these groups based on copolymerizable monomers is preferably at most 30% by weight, more preferably at most 15% by weight, based on the weight of the repeat units derived from polyolefin-based macromonomers. In addition, the repeat units derived from polyolefin-based macromonomers may comprise start groups and/or end groups which serve for functionalization or are caused by the preparation of the repeat units derived from polyolefin-based macromonomers. The proportion of these start groups and/or end groups is preferably at most 30% by weight, more preferably at most 15% by weight, based on the weight of the repeat units derived from polyolefin-based macromonomers.

The number-average molecular weight of the repeat units which are derived from polyolefin-based macromonomers is preferably in the range from 500 to 50 000 g/mol, more preferably from 700 to 10 000 g/mol, in particular from 1500 to 4900 g/mol and most preferably from 2000 to 3000 g/mol.

In the case of preparation of the comb polymers via the copolymerization of low molecular weight and macromolecular monomers, these values arise through the properties of the macromolecular monomers. In the case of polymer-analogous reactions, this property arises, for example, from the macroalcohols and/or macroamines used taking account of the converted repeat units of the main chain. In the case of graft copolymerizations, the proportion of polyolefins formed which have not been incorporated into the main chain can be used to conclude the molecular weight distribution of the polyolefin.

The repeat units which are derived from polyolefin-based macromonomers preferably have a low melting point, which is measured by means of DSC. The melting point of the repeat units derived from the polyolefin-based macromonomers is preferably less than or equal to −10° C., especially preferably less than or equal to −20° C., more preferably less than or equal to −40° C. Most preferably, no DSC melting point can be measured for the repeat units which are derived from the polyolefin-based macromonomers.

In addition to the repeat units which are derived from the polyolefin-based macromonomers, the inventive comb polymers comprise repeat units which are derived from low molecular weight monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers. These monomers are widely known in the technical field.

The expression "low molecular weight" makes it clear that some of the repeat units of the backbone of the comb polymer have a low molecular weight. Depending on the preparation, this molecular weight may result from the molecular weight of the monomers used to prepare the polymers. The molecular weight of the low molecular weight repeat units or of the low molecular weight monomers is preferably at most 400 g/mol, more preferably at most 200 g/mol and most preferably at most 150 g/mol.

Examples of styrene monomers having from 8 to 17 carbon atoms are styrene, substituted styrenes having an alkyl substituent in the side chain, for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes.

The expression "(meth)acrylates" encompasses acrylates and methacrylates, and also mixtures of acrylates and methacrylates. The alkyl(meth)acrylates having from 1 to 10 carbon atoms in the alcohol group include especially (meth)acrylates which derive from saturated alcohols, such as methyl(meth)acrylate, ethyl(meth)acrylate, n-propyl(meth)acrylate, isopropyl(meth)acrylate, n-butyl(meth)acrylate, tert-butyl(meth)acrylate, pentyl(meth)acrylate, hexyl(meth)acrylate, 2-ethylhexyl(meth)acrylate, heptyl(meth)acrylate, 2-tert-butylheptyl(meth)acrylate, octyl(meth)acrylate, 3-isopropylheptyl(meth)acrylate, nonyl(meth)acrylate, decyl(meth)acrylate; (meth)acrylates which derive from unsaturated alcohols, for example 2-propynyl(meth)acrylate, allyl(meth)acrylate, vinyl(meth)acrylate, oleyl(meth)acrylate; cycloalkyl(meth)acrylates such as cyclopentyl(meth)acrylate, 3-vinylcyclohexyl(meth)acrylate.

Preferred alkyl(meth)acrylates include from 1 to 8, more preferably from 1 to 4 carbon atoms in the alcohol group. The alcohol group here may be linear or branched.

Examples of vinyl esters having from 1 to 11 carbon atoms in the acyl group include vinyl formate, vinyl acetate, vinyl propionate, vinyl butyrate. Preferred vinyl esters include from 2 to 9, more preferably from 2 to 5 carbon atoms in the acyl group. The acyl group here may be linear or branched.

Examples of vinyl ethers having from 1 to 10 carbon atoms in the alcohol group include vinyl methyl ether, vinyl ethyl ether, vinyl propyl ether, vinyl butyl ether. Preferred vinyl ethers include from 1 to 8, more preferably from 1 to 4 carbon atoms in the alcohol group. The alcohol group here may be linear or branched.

The notation "(di)ester" means that monoesters, diesters and mixtures of esters, especially of fumaric acid and/or of maleic acid, may be used. The (di)alkyl fumarates having from 1 to 10 carbon atoms in the alcohol group include monomethyl fumarate, dimethyl fumarate, monoethyl fumarate, diethyl fumarate, methyl ethyl fumarate, monobutyl fumarate, dibutyl fumarate, dipentyl fumarate and dihexyl fumarate. Preferred (di)alkyl fumarates comprise from 1 to 8, more preferably from 1 to 4 carbon atoms in the alcohol group. The alcohol group here may be linear or branched.

The (di)alkyl maleates having from 1 to 10 carbon atoms in the alcohol group include monomethyl maleate, dimethyl maleate, monoethyl maleate, diethyl maleate, methyl ethyl maleate, monobutyl maleate, dibutyl maleate. Preferred (di)alkyl maleates comprise from 1 to 8, more preferably from 1 to 4 carbon atoms in the alcohol group. The alcohol group here may be linear or branched.

In addition to the repeat units detailed above, the inventive comb polymers may comprise further repeat units which are derived from further comonomers, their proportion being at most 20% by weight, preferably at most 10% by weight and more preferably at most 5% by weight, based on the weight of the repeat units.

These also include repeat units which are derived from alkyl(meth)acrylates having from 11 to 30 carbon atoms in the alcohol group, especially undecyl(meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl(meth)acrylate, 2-methylhexadecyl(meth)acrylate, heptadecyl(meth)acrylate, 5-isopropylheptadecyl(meth)acrylate, 4-tert-butyl-octadecyl(meth)acrylate, 5-ethyloctadecyl(meth)acrylate, 3-isopropyloctadecyl(meth)acrylate octadecyl(meth)acrylate, nonadecyl(meth)acrylate, eicosyl(meth)acrylate, cetyleicosyl(meth)acrylate, stearyleicosyl(meth)acrylate, docosyl(meth)acrylate and/or eicosyltetratriacontyl(meth)acrylate.

These also include repeat units which are derived from dispersing oxygen- and nitrogen-functionalized monomers, as listed below by way of example:

These include repeat units which are derived from aminoalkyl(meth)acrylates, such as
N,N-dimethylaminoethyl(meth)acrylate,
N,N-dimethylaminopropyl(meth)acrylate,
N,N-diethylaminopentyl(meth)acrylate,
N,N-dibutylaminohexadecyl(meth)acrylate.

These include repeat units which are derived from aminoalkyl(meth)acrylamides, such as
N,N-dimethylaminopropyl(meth)acrylamide.

These include repeat units which are derived from hydroxyalkyl(meth)acrylates, such as
3-hydroxypropyl(meth)acrylate,
3,4-dihydroxybutyl(meth)acrylate,
2-hydroxyethyl(meth)acrylate,
2-hydroxypropyl(meth)acrylate,
2,5-dimethyl-1,6-hexanediol(meth)acrylate,
1,10-decanediol(meth)acrylate.

These include repeat units which are derived from heterocyclic(meth)acrylates, such as
2-(1-imidazolyl)ethyl(meth)acrylate,
2-(4-morpholinyl)ethyl(meth)acrylate,
1-(2-methacryloyloxyethyl)-2-pyrrolidone,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone.

These include repeat units which are derived from heterocyclic vinyl compounds, such as 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

The aforementioned ethylenically unsaturated monomers may be used individually or as mixtures. It is additionally possible to vary the monomer composition during the polymerization of the main chain in order to obtain defined structures, for example block copolymers.

According to the invention, the comb polymers have a molar degree of branching in the range from 0.1 to 10 mol %, preferably from 0.8 to 6 mol %, more preferably from 0.8 to 3.4 mol % and especially preferably from 1.0 to 3.1 and most preferably from 1.4 to 2.8. The molar degree of branching of the comb polymers $f_{branch}$ is calculated by the formula $$f_{branch} = \frac{\sum_{a=1}^{A} n_a}{\sum_{a=1}^{A} n_a + \sum_{b=1}^{B} n_b}$$

where
A=number of types of repeat units which are derived from polyolefin-based macromonomers,
B=number of types of repeat units which are derived from low molecular weight monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers,
$n_a$=number of repeat units which are derived from polyolefin-based macromonomers of the type a in the comb polymer molecule
$n_b$=number of repeat units which are derived from low molecular weight monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, of type b in the comb polymer molecule.

The molar degree of branching arises generally from the ratio of the monomers used if the comb polymer has been prepared by copolymerization of low molecular weight and macromolecular monomers. For the calculation, it is possible here to use the number-average molecular weight of the macromonomer.

In a particular aspect of the present invention, the comb polymer, especially the main chain of the comb polymer, may have a glass transition temperature in the range from −60 to 110° C., preferably in the range from −30 to 100° C., more preferably in the range from 0 to 90° C. and most preferably in the range from 20 to 80° C. The glass transition temperature is determined by DSC. The glass transition temperature can be estimated via the glass transition temperature of the corresponding homopolymers taking account of the proportions of the repeat units in the main chain.

If the comb polymer has been obtained by polymer-analogous reaction or by graft copolymerization, the molar degree of branching is found by known methods of determining the conversion.

The proportion of at least 80% by weight, preferably at least 90% by weight, of low molecular weight repeat units which are derived from monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, and of repeat units which are derived from polyolefin-based macromonomers, is based on the weight of the repeat units. In addition to the repeat units, polymers generally also comprise start groups and end groups which can form through initiation reactions and termination reactions. In a particular aspect of the present invention, the statement of at least 80% by weight, preferably at least 90% by weight, of low molecular weight repeat units which are derived from monomers selected from the group consisting of styrene monomers having from 8 to 17 carbon atoms, alkyl(meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, and of repeat units which are derived from polyolefin-based macromonomers, is based on the total weight of the comb polymers. The polydispersity of the comb polymers is obvious to the person skilled in the art. These data are therefore based on a mean value over all comb polymers.

The inventive comb polymers can be prepared in various ways. A preferred process consists in the free-radical polymerization, which is known per se, of low molecular weight monomers and macromolecular monomers.

For instance, these polymers can be effected especially by free-radical polymerization, and also related processes for controlled free-radical polymerization, for example ATRP (=Atom Transfer Radical Polymerization) or RAFT (=Reversible Addition Fragmentation Chain Transfer).

Customary free-radical polymerization is explained, inter alia, in Ullmanns's Encyclopedia of Industrial Chemistry, Sixth Edition. In general, a polymerization initiator and a chain transfer are used for this purpose.

The usable initiators include the azo initiators well known in the technical field, such as AIBN and 1,1-azo-biscyclohexanecarbonitrile, and also peroxy compounds such as methyl ethyl ketone peroxide, acetylacetone peroxide, dilauryl peroxide, tert-butyl per-2-ethyl-hexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis-(tert-butylperoxy)cyclohexane, 1,1-bis(tert-butyl-peroxy)-3,3,5-trimethylcyclohexane, cumyl hydro-peroxide, tert-butyl hydroperoxide, bis (4-tert-butyl-cyclohexyl)peroxydicarbonate, mixtures of two or more of the aforementioned compounds with one another, and also mixtures of the aforementioned compounds with compounds which have not been mentioned and can likewise form free radicals. Suitable chain transferers are especially oil-soluble mercaptans, for example n-dodecyl mercaptan or 2-mercaptoethanol, or else chain transferers from the class of the terpenes, for example terpinolene.

The ATRP process is known per se. It is assumed that this is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly.

This reaction is described, for example, by J-S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387, disclose variants of the ATRP explained above.

In addition, the inventive polymers may be obtained, for example, also via RAFT methods. This process is presented in detail, for example, in WO 98/01478 and WO 2004/083169, to which reference is made explicitly for the purposes of disclosure.

The polymerization may be carried out at standard pressure, reduced pressure or elevated pressure. The polymerization temperature too is uncritical. However, it is generally in the range of $-20°-200°$ C., preferably $50°-150°$ C. and more preferably $80°-130°$ C.

The polymerization may be carried out with or without solvent. The term solvent is to be understood here in a broad sense. The solvent is selected according to the polarity of the monomers used, preference being given to using 100N oil, relatively light gas oil and/or aromatic hydrocarbons, for example toluene or xylene.

The low molecular weight monomers to be used to prepare the inventive comb polymers in a free-radical copolymerization are generally commercially available.

Macromonomers usable in accordance with the invention have exactly one double bond, which is preferably terminal.

The double bond may be present as a result of the preparation of the macromonomers. For example, a cationic polymerization of isobutylene forms a polyisobutylene (PIB) which has a terminal double bond.

In addition, functionalized polyolefinic groups may be converted to a macromonomer by suitable reactions.

For example, macroalcohols and/or macroamines based on polyolefins may be subjected to a transesterification or aminolysis with low molecular weight monomers which have at least one unsaturated ester group, for example methyl(meth)acrylate or ethyl(meth)acrylate.

This transesterification is widely known. For example, a heterogeneous catalyst system can be used for this purpose, such as lithium hydroxide/calcium oxide mixture (LiOH/CaO), pure lithium hydroxide (LiOH), lithium methoxide (LiOMe) or sodium methoxide (NaOMe) or a homogeneous catalyst system, such as isopropyl titanate (Ti(OiPr)$_4$) or dioctyltin oxide (Sn(Oct)$_2$O). The reaction is an equilibrium reaction. The low molecular weight alcohol released is therefore typically removed, for example, by distillation.

In addition, these macromonomers can be obtained by a direct esterification or direct amidation proceeding, for example, from methacrylic acid or methacrylic anhydride, preferably with acidic catalysis by p-toluenesulfonic acid or methanesulfonic acid or from free methacrylic acid by the DCC method (dicyclohexyl-carbodiimide).

In addition, the present alcohol or the amide can be converted to a macromonomer by reaction with an acid chloride, such as (meth)acryloyl chloride.

In addition, it is also possible to prepare a macroalcohol via the reaction of the terminal PIB double bond, as forms in cationically polymerized PIB, with maleic anhydride (ene reaction) and subsequent reaction with an α,ω-amino alcohol.

Moreover, suitable macromonomers can be obtained by reacting a terminal PIB double bond with methacrylic acid or by a Friedel-Crafts alkylation of the PIB double bond onto styrene.

In the preparations of the macromonomers detailed above, preference is given to using polymerization inhibitors, for example 4-hydroxy-2,2,6,6-tetramethyl-piperidine oxyl radical or hydroquinone monomethyl ether.

The macroalcohols and/or macroamines which are based on polyolefins and are to be used for the reactions detailed above can be prepared in a known manner.

In addition, some of these macroalcohols and/or macroamines are commercially available.

The commercially available macroamines include, for example, Kerocom® PIBA 03. Kerocom® PIBA 03 is a polyisobutylene (PIB) of $M_n$=1000 g/mol which has been NH$_2$-functionalized to an extent of about 75% by weight and is supplied as a concentrate of about 65% by weight in aliphatic hydrocarbons by BASF AG (Ludwigshafen, Germany).

A further product is Kraton Liquid® L-1203, a hydrogenated polybutadiene which has been OH-functionalized to an extent of about 98% by weight (also known as olefin copolymer OCP) and has about 50% each of 1.2 repeat units and 1.4 repeat units of $M_n$=4200 g/mol, from Kraton Polymers GmbH (Eschborn, Germany).

Further suppliers of suitable macroalcohols based on hydrogenated polybutadiene are Cray Valley (Paris), a daughter company of Total (Paris), and the Sartomer Company (Exton/Pa./USA).

The preparation of macroamines is described, for example, in EP 0 244 616 to BASF AG. The macroamines are prepared via hydroformylation and amination, preferably of polyisobutylene. Polyisobutylene offers the advantage of exhibiting no crystallization at low temperatures.

Advantageous macroalcohols may additionally be prepared according to the known patents to BASF AG, either via hydroboration (WO 2004/067583) of highly reactive polyisobutylene HR-PIB (EP 0 628 575), which contains an elevated proportion of terminal α-double bonds, or by hydroformylation followed by hydrogenation (EP 0 277 345). Compared to hydroformylation and hydrogenation, hydroboration affords higher alcohol functionalities.

Preferred macroalcohols based on hydrogenated polybutadienes can be obtained according to GB 2270317 to Shell International Research Maatschappij. A high proportion of 1.2 repeat units of about 60% and more can lead to significantly lower crystallization temperatures.

Some of the macromonomers detailed above are also commercially available, for example Kraton Liquid® L-1253, which is produced from Kraton Liquid® L-1203 and is a hydrogenated polybutadiene which has been methacrylate-functionalized to an extent of about 96% by weight and has about 50% each of 1.2 repeat units and 1.4 repeat units, from Kraton Polymers GmbH (Eschborn, Germany).

Kraton® L-1253 was synthesized according to GB 2270317 to Shell International Research Matschappij.

Macromonomers based on polyolefins and their preparation are also detailed in EP 0 621 293 and EP 0 699 694.

In addition to a free-radical copolymerization of macromonomers and low molecular weight monomers which has been detailed above, the inventive comb polymers may be obtained by polymer-analogous reactions.

In these reactions, a polymer is first prepared in a known manner from low molecular weight monomers and is then converted. In this case, the backbone of a comb polymer may be synthesized from a reactive monomer such as maleic anhydride, methacrylic acid or else glycidyl methacrylate and other unreactive short-chain backbone monomers. In this case, the initiator systems detailed above, such as t-butyl perbenzoate or t-butyl per-2-ethylhexanoate, and regulators such as n-dodecylmercaptan may find use.

In a further step, for example in an alcoholysis or aminolysis, the side chains, which are also referred to as arms, may be generated. In this reaction, the macroalcohols and/or macroamines detailed above may be used.

The reaction of the initially formed backbone polymer with macroalcohols and/or macroamines corresponds essentially to the reactions detailed above of the macroalcohols and/or macroamines with low molecular weight compounds.

For example, the macroalcohols and/or macroamines may be converted to the inventive comb polymers in grafting reactions known per se, for example onto the present maleic anhydride or methacrylic acid functionalities in the backbone polymer with catalysis, for example, by p-toluenesulfonic acid or methanesulfonic acid to give esters, amides or imides. Addition of low molecular weight alcohols and/or amines, such as n-butanol or N-(3-aminopropyl)morpholine, allows this polymer-analogous reaction to be conducted to complete conversions, especially in the case of maleic anhydride backbones.

In the case of glycidyl functionalities in the backbone, an addition of the macroalcohol and/or of the macroamine can be performed so as to form comb polymers.

In addition, the macroalcohols and/or the macroamines can be converted by a polymer-analogous alcoholysis or aminolysis with a backbone which contains short-chain ester functionalities in order to generate comb polymers.

In addition to the reaction of the backbone polymer with macromolecular compounds, suitably functionalized polymers which have been obtained by reacting low molecular weight monomers with further low molecular weight monomers to form comb polymers can be reacted. In this case, the initially prepared backbone polymer has a plurality of functionalities which serve as initiators of multiple graft polymerizations.

For instance, a multiple cationic polymerization of i-butene can be initiated, which leads to comb polymers with polyolefin side arms. Suitable processes for such graft copolymerizations are also the ATRP and/or RAFT processes detailed above in order to obtain comb polymers with a defined architecture.

In a particular aspect of the present invention, the comb polymer of the present invention has a low proportion of olefinic double bonds. The iodine number is preferably less than or equal to 0.2 g per g of comb polymer, more preferably less than or equal to 0.1 g per g of comb polymer. This proportion can be determined according to DIN 53241 after drawing off carrier oil and low molecular weight residual monomers at 180° C. under reduced pressure for 24 hours.

In a particular aspect of the present invention, the comb polymer preferably has repeat units which are derived from styrene, and repeat units which are derived from n-butyl methacrylate. The weight ratio of styrene repeat units and n-butyl methacrylate repeat units is preferably in the range of 90:10 to 10:90, more preferably 80:20 to 20:80.

In a further preferred embodiment of the present invention, the comb polymer preferably has repeat units which are derived from styrene, and repeat units which are derived from n-butyl acrylate. The weight ratio of styrene repeat units and n-butyl acrylate repeat units is preferably in the range of 90:10 to 10:90, more preferably 80:20 to 20:80.

In a further preferred feature of the present invention, the comb polymer preferably has repeat units which are derived from methyl methacrylate and repeat units which are derived from n-butyl methacrylate. The weight ratio of methyl methacrylate repeat units and n-butyl methacrylate repeat units is preferably in the range of 50:50 to 0:100, more preferably 30:70 to 0:100.

The inventive comb polymer can preferably be used in a lubricant oil composition. A lubricant oil composition comprises at least one lubricant oil.

The lubricant oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cyclo-alkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The fraction of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally ≧60% by weight, preferably ≧80% by weight, without any intention that this should impose a restriction. A preferred mineral oil contains from 0.5 to 30% by weight of aromatic fractions, from 15 to 40% by weight of naphthenic fractions, from 35 to 80% by weight of paraffin-base fractions, up to 3% by weight of n-alkanes and from 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:
n-alkanes having from approx. 18 to 31 carbon atoms: 0.7-1.0%,
slightly branched alkanes having from 18 to 31 carbon atoms: 1.0-8.0%, aromatics having from 14 to 32 carbon atoms:
0.4-10.7%,
iso- and cycloalkanes having from 20 to 32 carbon atoms:
60.7-82.4%,
polar compounds:
0.1-0.8%,
loss:
6.9-19.4%.

Valuable information with regard to the analysis of mineral oils and a list of mineral oils which have a different composition can be found, for example, in Ullmann's Encyclopedia of Industrial Chemistry, 5th Edition on CD-ROM, 1997, under "lubricants and related products".

Synthetic oils include organic esters, for example diesters and polyesters, polyalkylene glycols, polyethers, synthetic hydrocarbons, especially polyolefins, among which preference is given to polyalphaolefins (PAO), silicone oils and perfluoro-alkyl ethers. They are usually somewhat more expensive than the mineral oils, but have advantages with regard to their performance.

Natural oils are animal or vegetable oils, for example neatsfoot oils or jojoba oils.

These lubricant oils may also be used as mixtures and are in many cases commercially available.

The concentration of the comb polymer in the lubricant oil composition is preferably in the range from 0.1 to 40% by weight, more preferably in the range from 1 to 20% by weight, based on the total weight of the composition.

In addition to the aforementioned components, a lubricant oil composition may comprise further additives.

These additives include antioxidants, corrosion inhibitors, antifoams, antiwear components, dyes, dye stabilizers, detergents, pour point depressants and/or DI additives.

In addition, these additives comprise viscosity index improvers, dispersing assistants and/or friction modifiers, which are more preferably based on a linear polyalkyl(meth) acrylate having from 1 to 30 carbon atoms in the alcohol group. These linear polyalkyl(meth)acrylates are described especially in the prior art discussed by way of introduction, and these polymers may have dispersing monomers.

Preferred lubricant oil compositions have a viscosity, measured at 40° C. to ASTM D 445, in the range from 10 to 120 mm²/s, more preferably in the range from 22 to 100 mm²/s.

In a particular aspect of the present invention, preferred lubricant oil compositions have a viscosity index, determined to ASTM D 2270, in the range from 100 to 400, more preferably in the range from 150 to 350 and most preferably in the range from 200 to 300.

The invention will be illustrated in detail hereinafter with reference to examples, without any intention that this should impose a restriction.

A) Preparation of Macromonomers

Various macromonomers were prepared or obtained commercially. Table 1 shows a summary of the properties of the macroalcohols and/or macroamines used to prepare macromonomers.

The macroamine 1 is the polyisobutylene-based macroamine in Kerocom® PIBA 03, which was obtained commercially from BASF AG.

The macroalcohol 2 is a polyisobutylene-based macroalcohol which has been obtained according to EP 0 277 345.

The macroalcohols 3 and 4 are polyisobutylene-based macroalcohols which have been obtained according to WO 2004/067583.

The macroalcohol 5 is a macroalcohol which is based on hydrogenated polybutadiene and has been obtained according to GB 2270317.

$M_n$ is the number-average molecular weight, which can be determined by GPC against polyolefin standards of the same chemistry or by osmotic methods such as vapor pressure or membrane osmosis. The kinematic viscosity is described by $v$ and the dynamic viscosity by $\eta$ (ASTM D445). The proportion of 1.2 repeat units (vinyl repeat units) over the sum of 1.2 repeat units and 1.4 repeat units, as can be determined for (hydrogenated) polybutadiene by $^1H$ NMR spectroscopy, is given by $f_{vinyl}$. The melting point correlating to $f_{vinyl}$ by DSC is reported as $T_m$.

TABLE 1

| | $M_n$ [g/mol] | $v_{40°C}$ [mm²/s] | $v_{100°C}$ [mm²/s] | $\eta_{25°C}$ [mPas] | $\eta_{50°C}$ [mPas] | $\eta_{75°C}$ [mPas] | $f_{vinyl}$ [%] | $T_m$ [%] |
|---|---|---|---|---|---|---|---|---|
| Macro-amine 1 | 1000 | 4650 | 190 | | | | n.a. | n.a. |
| Macro-alcohol 2 | 2300 | 48 000 | 1500 | | | | n.a. | n.a. |
| Macro-alcohol 3 | 2300 | 48 000 | 1500 | | | | n.a. | n.a. |
| Macro-alcohol 4 | 4800 | | | | | | n.a. | n.a. |
| Macro-alcohol 5 | 4300 | | | 56 000 | | | 58 | −29 |
| Kraton ® L-1203 | 4200 | | | 35 000 | 4800 | 1300 | 50 | −17 |

The abbreviation "n.a." means that it was not possible to measure a melting point.

The macromonomer derived from macroamine is prepared by aminolysis of MMA. For this purpose, 1850 g of Kerocom® PIBA 03 (contains 35% aliphatic hydrocarbons) are dissolved in 1200 g of MMA with stirring at 60° C. 0.6 g of hydroquinone monomethyl ether and 0.12 g of 4-hydroxy-2,2,6,6-tetramethylpiperidino oxyl radical are added to the solution. After heating to MMA reflux (about 100° C.) with stabilized passage of air, about 30 g of MMA are distilled off for azeotropic drying. After cooling, 24 g of Sn(Oct)₂O are added and the mixture is heated to MMA reflux. At this temperature, the mixture is allowed to react for three hours. After cooling, 1000 g of water are added for catalyst precipitation and the mixture is stirred for 4 h. The biphasic mixture is separated in a separating funnel and the lower water phase is discarded. The upper organic phase is stirred with 10 g of kieselguhr (Celatom® FW-80) and filtered through a pressure filter (Seitz K800). Excess MMA and aliphatic hydrocarbons are drawn off on a vacuum rotary evaporator and the product is degassed. 1300 g of macromonomer are obtained.

The macromonomers derived from macroalcohols are prepared by transesterifying MMA. For this purpose, about 350 g of macroalcohol in each case are dissolved in 350 g of MMA with stirring at 60° C. for 12 hours. 200 mg of hydroquinone monomethyl ether and 20 mg of 4-hydroxy-2,2,6,6-tetramethylpiperidino oxyl radical are added to the solution. After heating to MMA reflux (about 100° C.) with stabilized passage of air, about 30 g of MMA are distilled off for azeotropic drying. After cooling, 2.7 g of LiOMe are added and heated to reflux of the methanol/MMA azeotrope (about 64° C.). The methanol/MMA azeotrope is distilled off constantly until a constant top temperature of about 100° C. is established. At this temperature, the mixture is allowed to continue to react for a further hour. After cooling, insoluble catalyst residues are removed under hot conditions by pressure filtration (Seitz T1000 depth filter). The product is finally degassed on a vacuum rotary evaporator. 350 g of macromonomer are obtained.

In the case of macroalcohols of relatively high molecular weights, the addition of KPE 100N oil at the start of the macromonomer synthesis may be helpful. The content of KPE 100N oil entrained into the comb polymer syntheses described below should be taken into account appropriately.

Kraton Liquid® L-1253 is a methacrylate-functionalized hydrogenated polybutadiene which is prepared from the OH-functionalized hydrogenated polybutadiene Kraton Liquid® L-1203, and has been obtained commercially from Kraton Polymers GmbH (Eschborn, Germany).

The macromonomer functionality $f_{MM}$ of each and every macromonomer was derived from the GPC curves of the comb polymers themselves. The GPC method for determining the mass-average molecular weight $M_w$ and the polydispersity index PDI of the comb polymers is described below. The measurements were effected in tetrahydrofuran at 35° C. against a polymethyl methacrylate calibration curve from a set of $\geq 25$ standards (Polymer Standards Service or Polymer Laboratories) whose $M_{peak}$ was in a uniform logarithmic distribution over the range from $5 \cdot 10^6$ to $2 \cdot 10^2$ g/mol. A combination of six columns (Polymer Standards Service SDV 100 Å/2× SDV LXL/2× SDV 100 Å/Shodex KF-800D) was used. To record the signal, an RI detector (Agilent 1100 Series) was used. The macromonomer functionality $f_{MM}$ was then determined by simple calculation from the ratio f between remaining integral area under the GPC trace of the macromonomer to the total integral under macromonomer and actual comb polymer as $f_{MM}=1-f/w_{MM}$. In this formula, $w_{MM}$ specifies the weight fraction of macromonomer weighed in based on all monomers. The values determined for the macromonomer functionality $f_{MM}$ are compiled in table 2. The same response factors for all repeat units were assumed. The polymerizations of the comb polymer syntheses were performed up to complete conversion of low molecular weight backbone monomers (nBMA, Sty, nBA, MMA and DiBF) with conversions of >99% (HPLC).

The properties of the compounds obtained are shown in table 2.

TABLE 2

| Compound obtained | Compound used | $f_{MM}$ [%] |
| --- | --- | --- |
| Macromonomer 1 | Macroamine 1 | 75 |
| Macromonomer 2 | Macroalcohol 2 | 59 |
| Macromonomer 3 | Macroalcohol 3 | 77 |
| Macromonomer 4 | Macroalcohol 4 | 54 |
| Macromonomer 5 | Macroalcohol 5 | 83 |
| Kraton ® L-1253 | Kraton ® L-1203 | 96 |

B) Syntheses of the Comb Polymers

EXAMPLES 1 TO 7 AND COMPARATIVE EXAMPLES 1 TO 4

An apparatus with 4-neck flask and precision glass saber stirrer is initially charged with a 150 g mixture of low molecular weight monomers and macromonomer whose composition is shown in table 3, and also 65 g of Shell Risella 907 oil and 35 g of KPE 100N oil. After heating to 120° C. under nitrogen, 0.9 g of t-butyl perbenzoate is added and the temperature is maintained. 3 h and 6 h after the first initiator addition, another 0.3 g of t-butyl perbenzoate each time is supplied and the mixture is stirred at 120° C. overnight. The next day, the mixture is diluted with 125 g of KPE 100 oil. 375 g of a 40% solution of comb polymers in mineral oil are obtained.

EXAMPLES 8 TO 11

An apparatus with 4-neck flask and precision glass saber stirrer is initially charged with a 150 g mixture of low molecular weight monomers and macromonomer whose composition is shown in table 3, and also 65 g of Shell Risella 907 oil and 35 g of KPE 100N oil. After heating to 90° C. under nitrogen, 0.3 g of t-butyl per-2-ethyl hexanoate is added and the temperature is maintained. 3 h and 6 h after the first initiator addition, another 0.3 g of t-butyl per-2-ethylhexanoate each time is supplied and the mixture is stirred at 90° C. overnight. The next day, the mixture is diluted with 125 g of KPE 100 oil. 375 g of a 40% solution of comb polymers in mineral oil are obtained.

EXAMPLES 12 AND 13

An apparatus with 4-neck flask and precision glass saber stirrer is initially charged with a 150 g mixture of low molecular weight monomers and macromonomer whose composition is shown in table 3, and also 100 g of toluene. After heating to 90° C. under nitrogen, 0.3 g of t-butyl per-2-ethyl hexanoate is added and the temperature is maintained. 2 h, 4 h, 6 h and 8 h after the first initiator addition, another 0.3 g of t-butyl per-2-ethylhexanoate each time is supplied and the mixture is stirred at 90° C. overnight. The next day, the mixture is diluted with 225 g of KPE 100 oil and the toluene is removed by degassing on a vacuum rotary evaporator. 375 g of a 40% solution of comb polymers in mineral oil are obtained.

Taking account of the net composition of macromonomer and low molecular weight monomers which form the 150 g and the macromonomer functionality $f_{MM}$, the net composition in terms of mass proportions and additionally, taking account of the molar masses of the monomers, the molar degree of branching $f_{branch}$ was determined for each comb polymer. The resulting values are shown in table 3. Moreover, the molecular weights and PDIs by GPC in tetrahydrofuran, which is a good solvent for all segments of the comb polymers, according to the method described above are reported.

Moreover, after drawing off carrier oil and low molecular weight residual monomers at 180° C. under reduced pressure for 24 hours, the comb polymers were analyzed by DSC. To this end, a sample amount of 10 mg was analyzed in a perforated DSC pan in the range from −80° C. to +130° C. at 10 K/min (Pyris 1, Perkin-Elmer). The glass transition $T_G$ of the backbone was determined from the second heating curve in each case (table 3).

TABLE 3

| | Monomer mixture Net composition [% by wt.] | | | Net polymer composition [% by wt.] | | |
|---|---|---|---|---|---|---|
| Example 1 | Kraton ® L-1253 45.0 | Sty 40.0 | nBMA 15.0 | 44 | 41 | 15 |
| Example 2 | Macromonomer 2 43.1 | Sty 42.6 | nBMA 14.3 | 31 | 52 | 17 |
| Example 3 | Macromonomer 2 37.2 | Sty 40.6 | nBMA 22.0 | 31 | 44 | 24 |
| Example 4 | Kraton ® L-1253 45.0 | Sty 35.6 | nBMA 19.4 | 44 | 36 | 20 |
| Example 5 | Macromonomer 4 53.3 | Sty 30.4 | nBMA 16.3 | 38 | 40 | 22 |
| Example 6 | Macromonomer 5 40.0 | Sty 12.0 | nBMA 48.0 | 36 | 13 | 52 |
| Example 7 | Macromonomer 2 44.0 | Sty 36.0 | DiBF 20.0 | 32 | 44 | 24 |
| Comparative example 1 | Macromonomer 2 82.2 | Sty 11.6 | nBMA 6.2 | 73 | 17 | 9 |
| Comparative example 2 | Macromonomer 2 2.5 | Sty 63.0 | nBMA 34.5 | 1 | 64 | 35 |
| Comparative example 3 | Macromonomer 2 40.0 | Sty 20.0 | C12-15MA 40.0 | 28 | 24 | 48 |
| Comparative example 4 | Macromonomer 2 20.0 | Sty 40.0 | C12-15MA 40.0 | 13 | 44 | 44 |
| Example 8 | Macromonomer 2 49.4 | nBMA 40.5 | MMA 10.1 | 37 | 51 | 13 |
| Example 9 | Kraton ® L-1253 45.0 | nBMA 49.5 | MMA 5.5 | 44 | 50 | 6 |
| Example 10 | Macromonomer 1 48.1 | nBMA 51.9 | | 41 | 59 | |
| Example 11 | Macromonomer 2 39.0 | nBMA 61.0 | | 27 | 73 | |
| Example 12 | Kraton ® L-1253 45.0 | Sty 42.1 | nBA 12.9 | 44 | 43 | 13 |
| Example 13 | Macromonomer 2 48.1 | Sty 39.6 | nBA 12.3 | 35 | 49 | 15 |
| Comparative example 5 | C12-15MA 100.0 | | | | | |
| Comparative example 6 | C12/14/16/18MA 75.0 | MMA 25.0 | | | | |

| | $f_{branch}$ | $M_w$ [g/mol] | PDI | Backbone $T_G$ [° C.] |
|---|---|---|---|---|
| Example 1 | 2.0% | 281 000 | 3.7 | +50 |
| Example 2 | 2.0% | 132 000 | 5.2 | +59 |
| Example 3 | 2.1% | 144 000 | 5.0 | |
| Example 4 | 2.1% | 270 000 | 5.5 | |
| Example 5 | 1.4% | 142 000 | 6.3 | |
| Example 6 | 1.6% | 183 000 | 3.9 | |
| Example 7 | 2.4% | | | +54 |
| Comparative example 1 | 11.5% | 83 500 | 6.9 | |
| Comparative example 2 | 0.07% | | | |
| Comparative example 3 | 2.8% | | | if present <−60 |
| Comparative example 4 | 0.9% | | | if present <−60 |
| Example 8 | 3.1% | 187 000 | 9.8 | +38 |
| Example 9 | 2.4% | 402 000 | 4.6 | |
| Example 10 | 8.2% | 353 000 | 13.4 | |
| Example 11 | 2.2% | 354 000 | 16.6 | |
| Example 12 | 2.0% | 181 000 | 3.8 | +46 |
| Example 13 | 2.4% | 79 100 | 4.1 | |
| Comparative example 5 | n.a. | 24 000 | 1.9 | |
| Comparative example 6 | n.a. | 43 000 | 2.0 | |

In table 3:
Sty: styrene
MMA: methyl methacrylate
nBMA: n-butyl methacrylate
nBA: n-butyl acrylate
DiBF: diisobutyl fumarate
C12-15MA: alkyl methacrylate mixture having from 12 to 15 carbon atoms in the alcohol radicals
C12/14/16/18MA: alkyl methacrylate mixture having 12, 14, 16 and 18 carbon atoms in the alcohol radicals Evaluation of the Comb Polymers The comb polymer additives obtained are characterized via VI measurements to ASTM D2270 and via PSSI measurements to ASTM D2603 Ref. B (12.5 min ultrasound) or to DIN 51381 (30 cycles of a Bosch pump) of a solution of established kinematic viscosity at 100° C. KV100=14.0 mm²/s (ASTM D445) in a 150N base oil (KV40=31.68 mm²/s, KV100=5.42 mm²/s, VI=105).

It is shown clearly that the inventive comb polymers have a significantly better relationship of VI, PSSI and solids content than the polymers detailed in the prior art according to EP 0699694. The results of the evaluation detailed are shown in table 4.

TABLE 4

| Polymer according to | Net polymer content [%] in 150N test oil for KV100 = 14 mm²/s | VI at KV100 = 14 mm²/s | PSSI to ASTM D2603 Ref. B (12.5 min ultrasound) | PSSI to DIN 51382 (30 cycles of Bosch pump) |
|---|---|---|---|---|
| Example 1 | 5.05 | 249 | 23.4 | 2.1 |
| Example 2 | 9.24 | 254 | 4 | |
| Example 3 | 7.96 | 255 | 6.5 | 0.0 |
| Example 4 | 5.83 | 245 | 15.1 | 1.6 |
| Example 7 | 11.34 | 224 | | |
| Example 9 | 4.4 | 263 | 29.4 | 3.8 |
| Example 11 | 5.81 | 284 | | 4.7 |
| Comparative example 1 | 7.41 | 169 | 36.9 | |
| Comparative example 2 | insoluble | | | |
| Comparative example 3 | 6.21 | 173 | | 11.3 |
| Comparative example 4 | 5.95 | 164 | | 18.2 |

In addition, comb polymers according to the present invention were compared with linear, exceptionally shear-stable PAMA (comparative example 5). In this case, the solids contents of the polymers were adjusted to a solution viscosity of KV100=13.15 mm²/s in a VII-free D/I package-containing API group III base oil composed of polyalphaolefin and hydrocrack oil (KV100=5.15 mm²/s, KV40=25.30 mm²/s, VI=137, pour point −45° C. to ASTM D97). Here too, significant advantages in the polymer content and also VI are found with comparable or even better PSSI to DIN 51350 part 6 (20 h or 192 h, tapered roller bearing). In the dynamic low-temperature viscosity at −40° C. to DIN 51398 and the pour point to ASTM D97 too, exceptionally advantageous values are found for the comb polymers. The comparison of example 6 with example 12 shows additionally that comb polymers which are based on OCP macromonomers of elevated proportion of 1.2 repeat units are significantly better in their low-temperature properties. The results obtained from the analyses detailed above are shown in table 5.

TABLE 5

| Polymer according to | Net polymer content [%] in D/I package-containing group III base oil for KV100 = 13.15 mm²/s | VI at KV100 = 12.15 mm²/s | PSSI to DIN 51350 part 6 (20 h, tapered roller bearing) | PSSI to DIN 51350 part 6 (192 h, tapered roller bearing) |
|---|---|---|---|---|
| Example 2 | 11.2 | 266 | 12.2 | |
| Example 5 | 10.2 | 259 | 20.2 | 46.1 |
| Example 6 | 7.6 | 261 | | |
| Example 8 | 10.0 | 242 | 24.8 | |
| Example 12 | 7.9 | 239 | 16.1 | 43.5 |
| Example 13 | 10.4 | 213 | 10.6 | |
| Comparative example 5 | 22.1 | 176 | 19.0 | 45.0 |

| Polymer according to | Dynamic viscosity at −40° C. to DIN 51398 in a liquid bath [mPas] | Pour point to ASTM D97 [° C.] |
|---|---|---|
| Example 2 | 19 600 | −45 |
| Example 5 | 25 900 | |
| Example 6 | 34 000 | −45 |
| Example 8 | 29 300 | −45 |
| Example 12 | solid | −27 |
| Example 13 | 37 500 | |

Moreover, a comb polymer was used as a VII in an ISO46/VI160 hydraulic oil formulation based on API group I 100 N/600N oils and, in the PSSI to DIN 51350 (part 6, 20 h, tapered roller bearing), compared to a linear PAMA (comparative example 6). It was found that an exceptionally high reduction in the necessary solids content to less than 33% with equal to slightly better PSSI is possible. The compositions of the hydraulic oil formulations and the results obtained from the analysis are shown in table 6.

TABLE 6

| Polymer according to | Net polymer content [%] in ISO46/VI160 formulation | Oronite Oloa 4992 antiwear hydraulic additive [%] | 600N [% by wt.] | 100N [% by wt.] |
|---|---|---|---|---|
| Example 12 | 8.3 | 0.6 | 18.5 | 72.6 |
| Comparative example 6 | 2.6 | 0.6 | 34.4 | 62.4 |

| Polymer according to | KV100 [mm²/s] | KV40 [mm²/s] | VI | PSSI to DIN51350 part 6 (20 h, tapered roller bearing) |
|---|---|---|---|---|
| Example 12 | 8.48 | 46.41 | 161 | 19.2 |
| Comparative example 6 | 8.51 | 46.8 | 161 | 17.4 |

The invention claimed is:

1. A comb polymer comprising, in the main chain, repeat units which are derived from polyolefin-based macromonomers, and repeat units which are derived from low molecular weight monomers selected from the group consisting of styrene monomers having from 8 to 17 carbon atoms, alkyl (meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, wherein the molar degree of branching is in the range from 0.1 to 10 mol % and the comb polymer comprises a total of at least 80% by weight, based on the weight of the repeat units, of repeat units which are derived from polyolefin-based macromonomers, and repeat units which are derived from low molecular weight monomers selected from the group consisting of styrene monomers having from 8 to 17 carbon atoms, alkyl (meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers, wherein the main chain has a glass transition temperature in the range from −30 to 100° C.

2. The comb polymer as claimed in claim 1, wherein the repeat units which are derived from polyolefin-based macromonomers have a number-average molecular weight in the range from 700 to 10 000 g/mol.

3. The comb polymer as claimed in claim 1, wherein the comb polymer comprises at least 90% by weight of repeat units which are derived from polyolefin-based macromonomers and are derived from low molecular weight monomers selected from the group consisting of styrene monomers having from 8 to 17 carbon atoms, alkyl (meth)acrylates having from 1 to 10 carbon atoms in the alcohol group, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, and mixtures of these monomers.

4. The comb polymer as claimed in claim 1, wherein the molar degree of branching is in the range from 0.8% to 6.0%.

5. The comb polymer as claimed in claim 4, wherein the molar degree of branching is in the range from 0.8% to 3.4%.

6. The comb polymer as claimed in claim 1, wherein the iodine number is less than or equal to 0.2 g per g of comb polymer.

7. The comb polymer as claimed in claim 1, wherein the repeat units derived from polyolefin-based macromonomers comprise groups which are derived from monomers selected from the group consisting of C2-C10-alkenes and/or C4-C10-alkadienes.

8. The comb polymer as claimed in claim 7, wherein the repeat units derived from polyolefin-based macromonomers comprise at least 80% by weight of groups which are derived from monomers selected from the group consisting of C2-C10-alkenes and/or C4-C10-alkadienes, based on the weight of the repeat units derived from polyolefin-based macromonomers.

9. The comb polymer as claimed in at claim 1, wherein the repeat units derived from polyolefin-based macromonomers comprise groups which are derived from non-olefinic monomers selected from the group of styrenes, (meth)acrylates, vinyl esters, vinyl ethers, fumarates and maleates.

10. The comb polymer as claimed in claim 9, wherein the repeat units derived from polyolefin-based macromonomers comprise at most 20% by weight of groups which are derived from non-olefinic monomers selected from the group of styrenes, (meth)acrylates, vinyl esters, vinyl ethers, fumarates and maleates, based on the weight of the repeat units.

11. The comb polymer as claimed in claim 1, wherein the melting point of the repeat units derived from polyolefin-based macromonomers is less than or equal to −10° C.

12. The comb polymer as claimed in claim 1, wherein the comb polymer has repeat units which are derived from styrene, and repeat units which are derived from n-butyl methacrylate.

13. The comb polymer as claimed in claim 1, wherein the comb polymer has repeat units which are derived from styrene, and repeat units which are derived from n-butyl acrylate.

14. The comb polymer as claimed in claim 1, wherein the comb polymer has repeat units which are derived from methyl methacrylate and repeat units which are derived from n-butyl methacrylate.

15. The comb polymer as claimed claim 1, wherein the comb polymer has a weight-average molecular weight in the range from 50 000 to 500 000 g/mol.

16. A process for preparing comb polymers as claimed in claim 1, wherein macromonomers and low molecular weight monomers are copolymerized.

17. A process for preparing comb polymers as claimed in claim 1, wherein a functionalized main chain polymer is first prepared, which is formed from low molecular weight monomers, and then the main chain polymer prepared is reacted by a polymer-analogous reaction.

18. The process as claimed in claim 17, wherein the polymer-analogous reaction is an alcoholysis by macroalcohols and/or an aminolysis by macroamines.

19. The process as claimed in claim 18, wherein the main chain polymer comprises acid groups, amide groups, ester groups and/or acid anhydride groups.

20. The process as claimed in claim 16, wherein the process is performed batchwise.

21. The process as claimed in claim 16, wherein the reaction is performed in the presence of a solubilizing carrier medium.

22. The process as claimed in claim 21, wherein the carrier medium is selected from the group of the gas oils and/or the aromatic hydrocarbons.

23. The process as claimed in claim 16, wherein the reaction is performed free of regulators.

24. A lubricant oil formulation comprising comb polymers as claimed in claim 1.

25. The lubricant oil formulation as claimed in claim 24, wherein the lubricant oil formulation comprises base oils of API group I, II, III, IV and/or group V.

26. The lubricant oil formulation as claimed in claim 24, wherein the viscosity index is at least 200.

27. The lubricant oil formulation as claimed in claim 24, wherein the PSSI to ASTM D2603 Ref. B is less than or equal to 45.

28. The lubricant oil formulation as claimed in claim 24, wherein the lubricant oil formulation comprises at least one additional additive.

29. The lubricant oil formulation as claimed in claim 28, wherein the additive is a viscosity index improver, pour point improver, dispersing assistant and/or friction modifier.

30. The lubricant oil formulation as claimed in claim 28, wherein the additive is based on a linear polyalkyl (meth)acrylate having from 1 to 30 carbon atoms in the alcohol group.

31. A method for improving a viscosity index, pour point, dispersing assistants and/or friction modifiers comprising admixing a comb polymer of claim 1 to a lubricant oil.

32. A comb polymer, comprising:
repeat units of one or more polyolefin-based macromonomers, and
repeat units of one or more low molecular weight monomers selected from the group consisting of a styrene monomer having from 8 to 17 carbon atoms, an alkyl (meth)acrylate having from 1 to 10 carbon atoms in the alcohol group, a vinylester having from 1 to 11 carbon atoms in the acyl group, a vinylether having from 1 to 10 carbon atoms in the alcohol group, a (di)alkylfumarate having from 1 to 10 carbon atoms in the alcohol group, a (di)alkylmaleate having from 1 to 10 carbon atoms in the alkyl group and mixtures thereof;
wherein the repeat units of the polyolefin-based macromonomers and the repeat units of the low molecular weight monomers are present in the main chain of the copolymer;
wherein the molar degree of branching of the comb polymer is from 1.4 to 8.2 mol %;
wherein at least 80% by weight of the repeat units of the comb polymer is the weight of the repeat units of the polyolefin-based macromonomer and repeat units of the low molecular weight monomer wherein % by weight id based on the total weight of all of the repeat units of the comb polymer;
wherein the repeat units of the polyolefin-based macromonomer are present in an amount of from 27 to 44% by weight in the comb polymer; and
wherein the low molecular weight monomer comprises a styrene monomer and an acrylate monomer wherein the styrene monomer is present in the comb polymer in an amount of from 13 to 73% by weight and the acrylate monomer is present in the comb polymer in an amount of from 6 to 52% by weight.

33. A comb polymer, comprising:
repeat units of one or more polyolefin-based macromonomers, and
repeat units of one or more low molecular weight monomers selected from the group consisting of a styrene monomer having from 8-17 carbon atoms, an alkyl (meth)acrylate having from 1-10 carbon atoms in the alcohol group, a vinylester having from 1-11 carbon atoms in the acyl group, a vinylether having from 1-10 carbon atoms in the alcohol group, a (di)alkylfumarate having from 1-10 carbon atoms in the alcohol group, a (di)alkylmaleate having from 1-10 carbon atoms in the alkyl group and mixtures thereof;
wherein the repeat units of the polyolefin-based macromonomers and the repeat units of the low molecular weight monomers are present in the main chain of the copolymer;
wherein the molar degree of branching of the comb polymer is from 1.4 to 8.2 mol %;
wherein at least 80% by weight of the repeat units of the comb polymer is the weight of the repeat units of the polyolefin-based macromonomer and repeat units of the low molecular weight monomer wherein % by weight id based on the total weight of all of the repeat units of the comb polymer;
wherein the polyolefin-based macromonomer is present in the comb polymer in an amount of from 27-44% by weight and the comb polymer comprises at least two different low molecular weight monomers; and
wherein the low molecular monomer comprises from 13-73% by weight of a styrene monomer based on the total weight of the repeating units in the comb polymer.

* * * * *